July 24, 1951            A. L. BAUSMAN           2,561,775
TRAY EMPTYING MECHANISM FOR CONFECTIONERY
MOLDING MACHINES
Filed April 6, 1949                             5 Sheets-Sheet 1
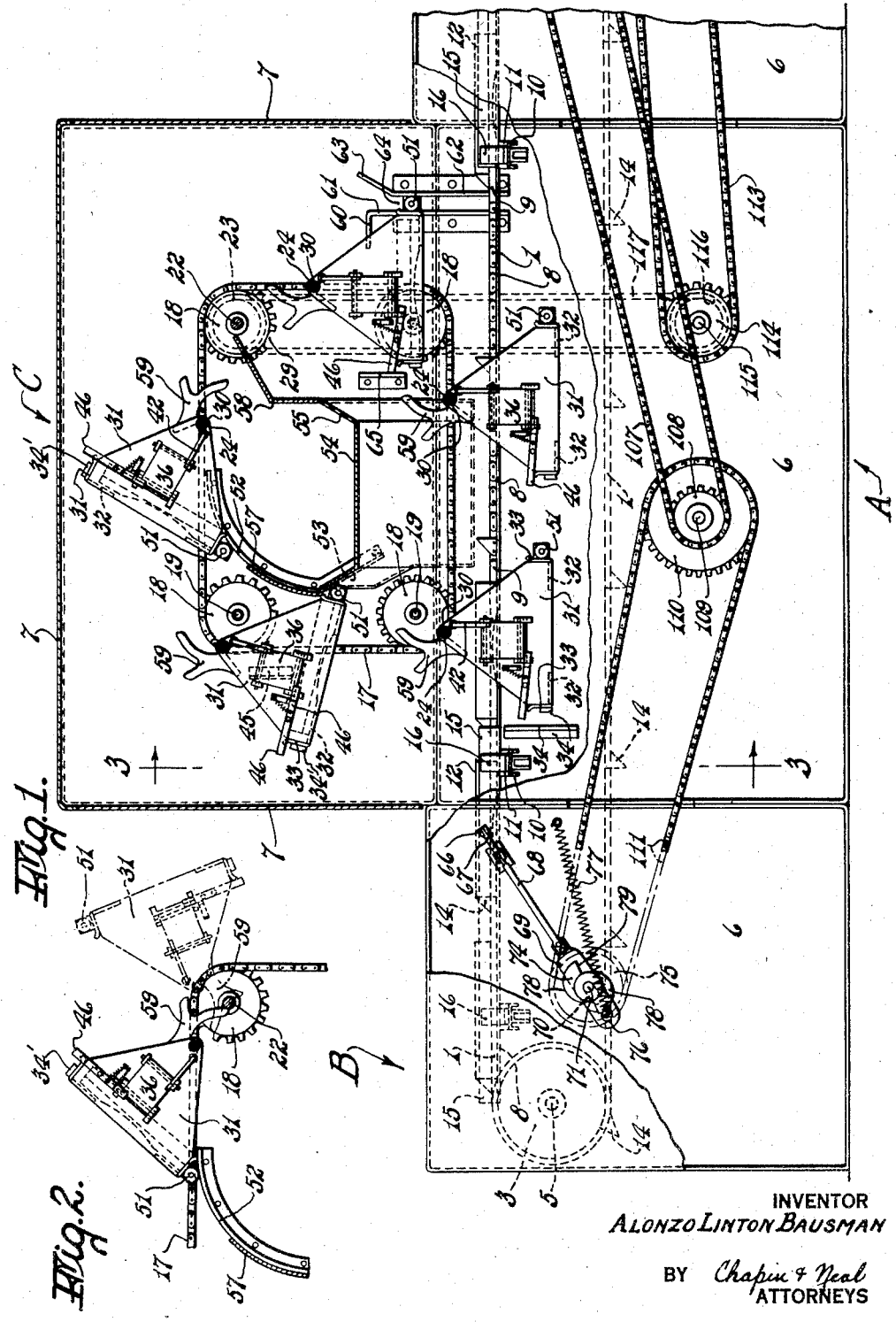
INVENTOR
ALONZO LINTON BAUSMAN
BY *Chapin & Neal*
ATTORNEYS

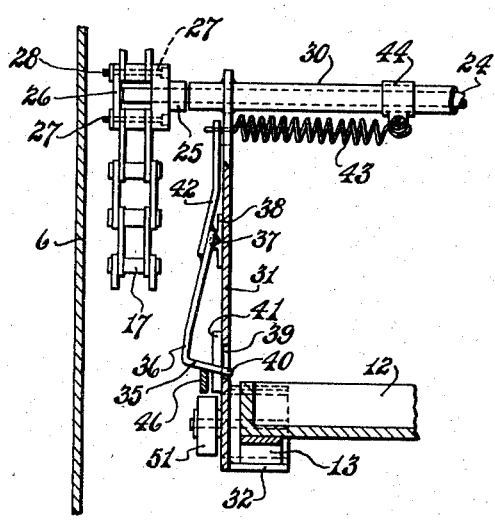
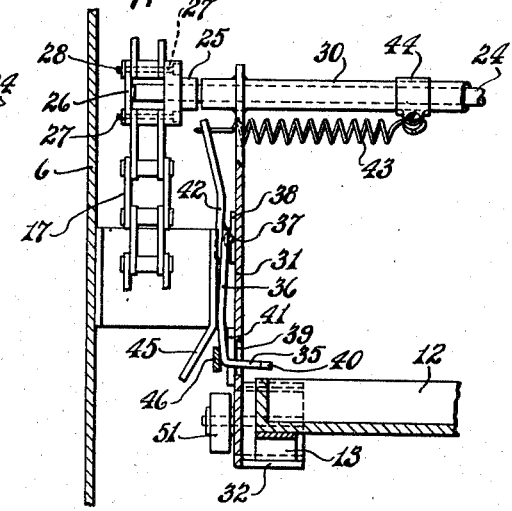
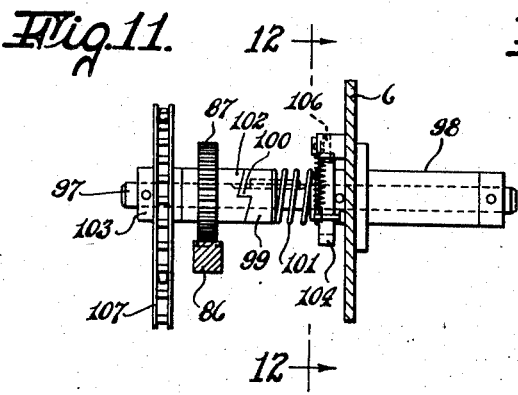
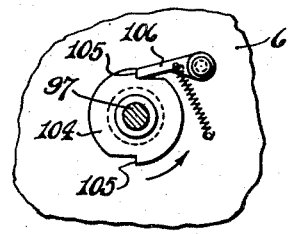

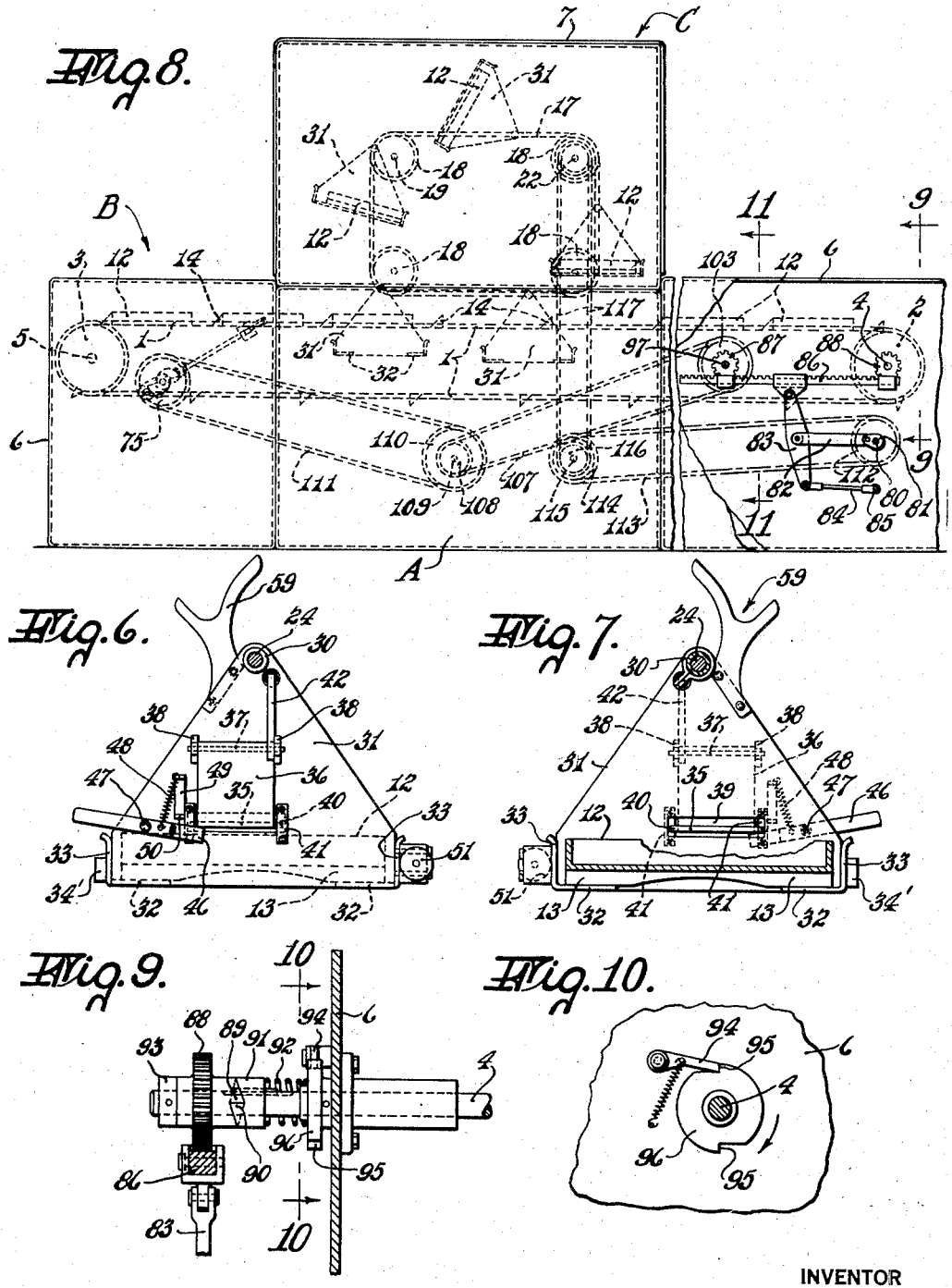

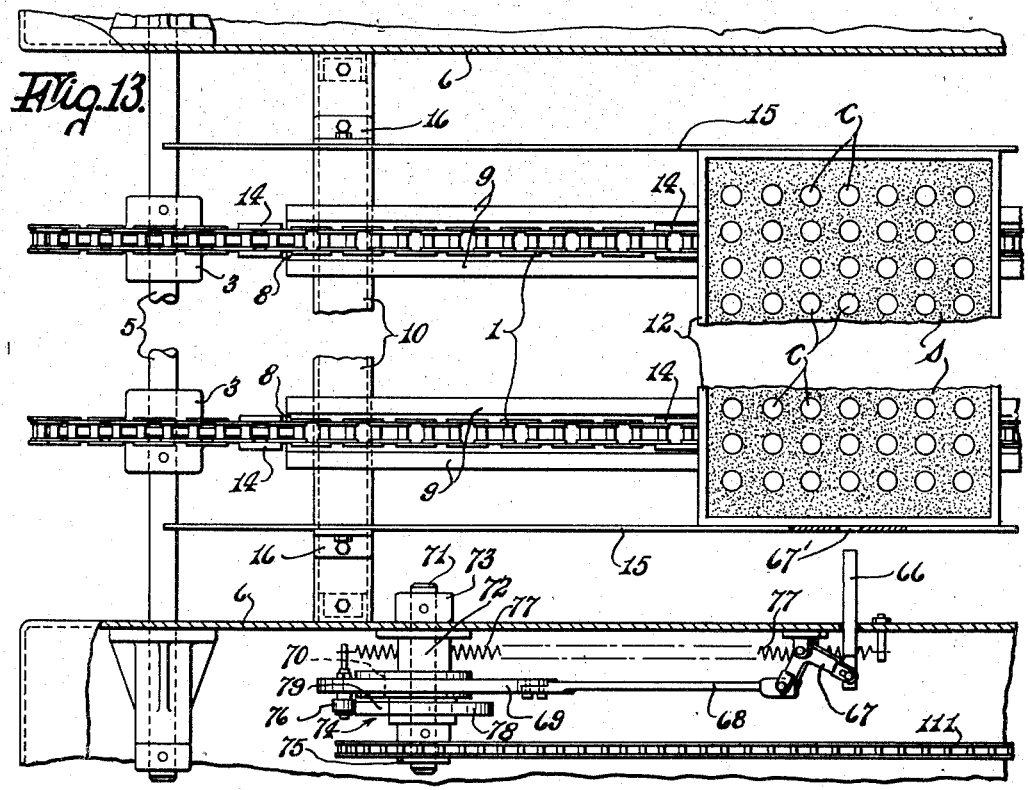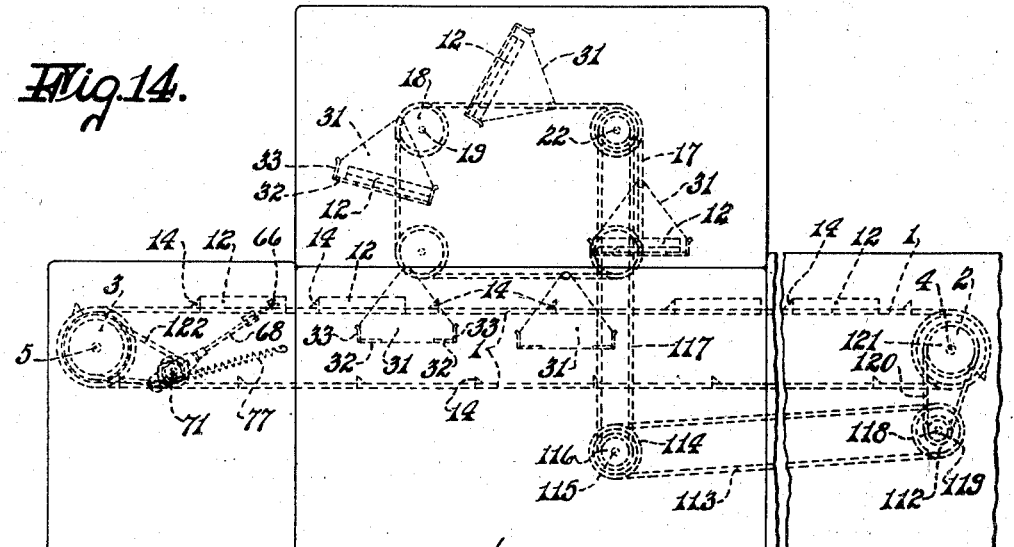

Patented July 24, 1951

2,561,775

UNITED STATES PATENT OFFICE 2,561,775

TRAY EMPTYING MECHANISM FOR CONFECTIONERY MOLDING MACHINES

Alonzo Linton Bausman, Springfield, Mass., assignor to Mill River Tool Company, Springfield, Mass., a partnership Application April 6, 1949, Serial No. 85,742

7 Claims. (Cl. 214—1.1)

This invention relates to improvements in mechanism for emptying the trays in a machine for automatically molding confectionery.

One illustrative example of a machine of this class is shown in my prior Patent No. 1,169,602, granted January 25, 1916. The confections are cast in molds formed in starch contained in trays. A single tray will contain a large number of molds. In the machine, trays containing confections, which have been cast in such molds and which have set, are automatically fed one by one to a conveyer, which carries them successively to and through various mechanisms. The first mechanism, with which this invention is particularly concerned, inverts the tray, emptying its contents into a chute, by which the confections and starch are carried to a reciprocating, brush-lined sieve, wherein the confections are separated from the starch, cleaned and delivered. The empty trays are successively carried to mechanisms, which fill the trays with starch, level off the starch, form the molds in the starch, and finally fill the molds with confectionery material.

The tray-emptying devices of the prior art confectionery molding machine operate intermittently. The tray to be emptied is thrust into the jaws of a dumper while it is at rest; the dumper turns to empty the tray; and then comes to rest, while the emptied tray is removed from the dumper and another tray to be emptied placed therein. Such mechanism is slow and because of its frequent stops and starts creates undesirable vibrations and noise. Usually, only one tray can be handled by the dumper at one time.

This invention has for an object the provision, in a confectionery molding machine, of improved tray-emptying mechanism, which may be operated continuously and rapidly and without undue vibration and noise. The mechanism is such that it may be used with a continuously-operable conveyer which moves the trays to be emptied successively into the emptying mechanism and removes the empty trays therefrom, as well as with the step by step conveyers, now generally used in the trade and shown in my prior patent.

The invention will best be understood from the detailed description of the one illustrative example of it shown in the accompanying drawings, in which—

Fig. 1 is an elevational view with parts broken away and parts in section of a tray emptying mechanism, embodying the invention and a portion of a cooperating tray conveyer;

Fig. 2 is a fragmentary sectional elevational view of the tray emptying mechanism showing the parts in different relative positions;

Figs. 4 and 5 are fragmentary cross sectional views, taken similarly to Fig. 3 but showing parts in different relative positions;

Figs. 6 and 7 are end and sectional elevational views, respectively, of one of the tray carrying devices of the tray emptying mechanism;

Fig. 8 is a small scale side elevational view of the tray emptying mechanism, part of the cooperating tray-conveyer, the tray-rapping means and the driving means therefor;

Fig. 9 is a fragmentary sectional view taken on the line 9—9 of Fig. 8;

Fig. 10 is a sectional view taken on the line 10—10 of Fig. 9;

Fig. 11 is a fragmentary sectional view taken on the line 11—11 of Fig. 8;

Fig. 12 is a sectional view taken on the line 12—12 of Fig. 11;

Fig. 13 is a fragmentary plan view showing the tray-rapping means; and

Fig. 14 is a view taken similarly to Fig. 8 but showing a modification.

Figure 3:
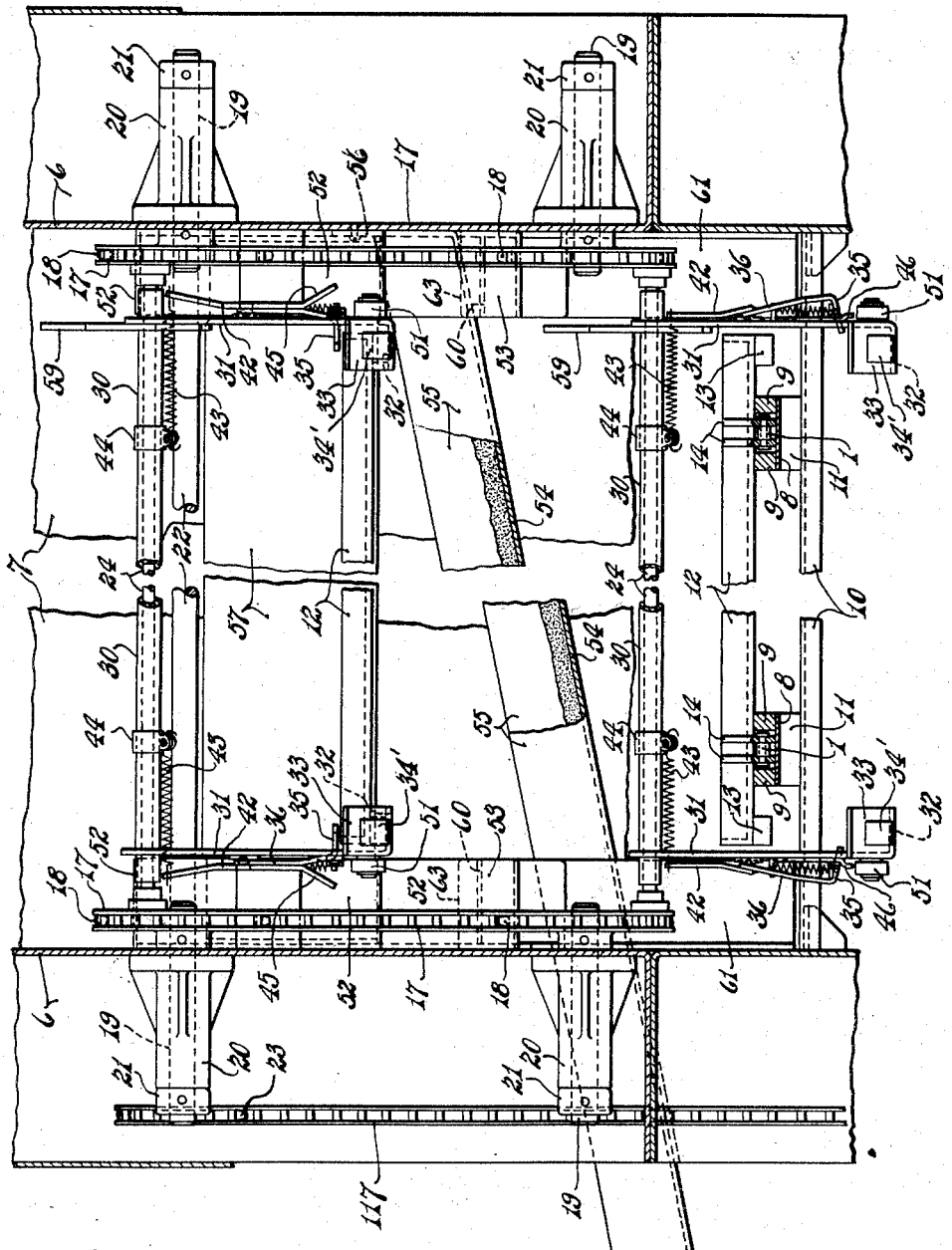
Fig. 3 is a fragmentary cross sectional view taken on the line 3—3 of Fig. 1.

Referring to these drawings, there is shown in Fig. 8, a portion only of a confectionery molding machine of the above-mentioned class. The machine includes a suitable casing A, within which is mounted a conveyer to carry the trays in a substantially horizontal path to and through the several stations, above referred to, for the performance of the several operations, above described. This conveyer includes two laterally-spaced endless sprocket chains 1 (Fig. 13). Each chain is mounted on sprockets 2 and 3, respectively fixed to shafts 4 and 5. These shafts are suitably supported from and extend between side frames 6 as shown in connection with shaft 5 in Fig. 13. These frames 6 form the sides of casing A. The latter also includes covers 7 (Figs. 1 and 3) which extend between the two side frames 6, except at the tray feeding station, marked B. The upper stretch of each chain 1 travels over a plate 8 and between two runway strips 9 (Figs. 3 and 13), which are fixed to the plate in spaced parallel relation and between which the chain travels, riding between the strips 9 and being supported on the plate 8. The plate 8 is supported at longitudinally-spaced intervals from channel irons 10 (Fig. 1), which extend between and are secured at their ends to the side frames 6 (Fig. 3). Each plate rests on, and is fixed to, a block 11, which in turn rests on, and is fixed to, a channel iron 10. Trays 12, each having a rectangular bottom (Fig. 13) with upstanding side and end walls (Fig. 7), together with a foot 13 at each end, rest upon the runways 9 and are moved along the same by lugs 14 on the chains 1. Side guides 15 (Figs. 1 and 13) are provided, cooperating with the end walls of the trays to position them on the runways so that both ends of each tray will project beyond the outer sides of the runways. The distance between the outer sides of the runways is substantially less than the length of a tray. These guides 15 are secured to angle irons 16, which are fixed to the channel irons 10. The trays 12, filled with confections c and starch s (Fig. 13), are fed to the conveyers 1 at the location B (Fig. 1) in any suitable way, as for example, by the tray-feeding mechanism shown in said patent, or even by hand, if desired. They are moved forwardly (to the right) by the conveyer to various stations, as above set forth. Only one such station is completely shown herein, the one marked C, where the trays are emptied.

The tray-emptying means include a series of tray carriers, pivotally hung at longitudinally-spaced points from two endless sprocket chains 17. Each chain is trained around four sprockets 18 so located that the chain travels in a substantially rectangular closed loop path located entirely above the upper stretch of chains 1. Each sprocket 18, except the pair at the upper right hand rounded corner of said path, is fixed to one end of a stub shaft 19 (Fig. 3), rotatably mounted in a bearing 20, fixed to a side frame 6. A collar 21, fixed to the other end of each stub shaft 19, cooperates with the hub of a sprocket 18 by engaging opposite ends of bearings 20 to hold such shaft against undue axial movement. The pair of sprockets 18 at said upper right hand corner are both fixed to a shaft 22, which is supported near its ends in bearings, such as 20, and extends across between the two sprockets. Fixed to the left hand end of shaft 22 is a driving sprocket 23, the hub of which engages the outer end of the left hand bearing 20. On the other end of this shaft is fixed a collar, such as 21, which engages the outer end of the right hand bearing 20, whereby the shaft 22 is held in the desired axial position. The chains 17 are spaced apart by a distance somewhat greater than the length of a tray 12.

These chains 17 have at longitudinally-spaced intervals pairs of specially formed links (Fig. 4) for supporting cross rods 24, from which the tray carriers are suspended. One element of each of such pair consists of a flanged hub 25 for supporting one end of rod 24 and the other element consists of a plate 26. The elements 25 and 26 are held together and connected to the adjacent links of chain 17 by pins 27, the heads on one end of which are sunk into the flange of element 25 while the other end of each pin is held by a cotter pin 28. The ends of rod 24 are held between the plates 26 of the two chains for confining it against undue axial displacement. Due to the rod extending through the space between the elements 25 and 26, it is necessary to remove one tooth of each sprocket 18, as at 29 (Fig. 1) to receive the rod. The circumference of each sprocket 18 at its pitch circle equals the center to center distance between successive cross rods 24.

Each tray carrier includes a cross member in the form of a tube 30 (Fig. 3) mounted on a rod 24 with freedom to turn thereon and held against undue axial displacement by the hubs of the special link elements 25, which lie one closely adjacent each end of the tube. To each cross member 30 is suitably fixed, as by welding, two hangers or sides 31, which are made of thin sheet metal and may be approximately triangular in form, as shown. Each hanger 31, at the end opposite that at which it is pivoted to chain 17, has seats which are adapted to receive and support one end of a tray 12. For this purpose, the member 31 has one or more inturned flanges 32, which support one foot of the tray, except when the latter is inverted as will later appear. Each member 31 (Fig. 7) also has flanges 33 (herein shown as upturned one from the outer end of each flange 32) for cooperation with the sides of a tray 12 to limit its sidewise displacement. The hangers 31 cooperate with the ends of a tray to limit endwise displacement thereof. Thus the tray-receiving seat is formed by the parts 31, 32 and 33 and each carrier has two seats one on each side in confronting relation.

It will be noted from Fig. 3 that each tray carrier is approximately of the form of a broad inverted U with its sides 31 spaced apart by a distance slightly greater than the length of a tray 12. These carriers, while moving in their lower horizontal stretch of travel (Figs. 1 and 3), have their cross members 30 located well above the tray-conveying chains 1 and the trays 12 thereon, and their sides extend downwardly far enough so that the tray-receiving seats are located entirely below the chains 1 and the bottoms of the runways 9. The side guides 15 (Fig. 1) are, of course, omitted where the trays pass through the emptying station as are also the cross channel irons 10. Each tray carrier, in effect, straddles the two runways 9 and the chains 1, as shown in Fig. 3. Thus, each tray carrier may have its tray-engaging parts move along to the left (Fig. 1) beneath the runways 9 and then rise to catch the ends of a tray 12 and lift it off the runways. The lower left hand tray carrier in Fig. 1 has just started to move upwardly in a curved path and, when it reaches the end of such path, the flanges 33 will be so positioned as to receive the tray 12 between them as the carrier enters its vertically upward path of travel. An abutment 34, fixed to a side frame 6, will be engaged by an arm 34' projecting outwardly from the left hand rear flange 33 in order to insure proper positioning of the flanges 33 to receive the tray. In the Fig. 1 form of the invention, the conveyer chains 1 move step by step and the conveyer chains 17 move continuously. The two conveyers are so timed that a tray carrier rises to lift a tray 12 during a period of rest of chains 1 while the tray is stationary on its runways. However, the intermittent movement of the conveyer chains 1 is not essential to the invention as will later appear.

The trays, as they successively move through their upper horizontal stretch of travel are to be inverted and emptied of their contents. Hence, it is necessary to prevent the tray from falling from its end seats in the sides of its carrier while the latter is inverted. For this purpose, a stop plate 35 (Figs. 4 and 5) on each side 31 is moved inwardly at the proper time to overlie the upper end wall of a tray 12. In this case, this stop plate is formed by bending over the lower end of a plate 36. The upper end of plate 36 is suitably fixed, as by welding, to a rod 37 (Fig. 6), the ends of which are received, as trunnions, one in each of a pair of bearings 38, fixed to the outer face of a side 31. The latter is slotted at 39 (Figs.

4 and 7) to allow the stop plate 35 to pass through it. The inner end of plate 35 (Fig. 7) is wider than the remainder thereof, thus forming ears 40, one at each end, which are adapted to abut one with each of two stops 41, which are fixed to the hanger 31 and cross the ends of slot 39 (Figs. 6 and 7). The latter is initially wide enough to pass the plate 35 and both ears 40 and after these parts have been passed through the slot, the stops 41 are put in place to prevent the passage of the ears 40 out of the slot. The plate 36 has fixed to its upper end an upwardly extending arm 42 (Fig. 4), the upper end of which is connected by a coil spring 43 to a collar 44 fixed on tube 30. This spring holds the stop plate 35 retracted in the position of Fig. 4 with the ears 40 abutting the stops 41.

As the tray carriers successively near the upper end of their ascending stretch of travel, their plates 36 are forced inwardly into the Fig. 5 position. This is done by cams 45, fixed one to each of the side frames 6, as shown in Fig. 3, and located in the path of travel of plates 36. The location of one cam is indicated in Fig. 1 from which it will be seen that the cam is much more narrow than the plate 36 and that the cam is located so as to clear the spring arm 42, as well as a latch lever 46, soon to be described. It will be clear from Fig. 4 that as each plate 36 engages and moves along its cam 45, it will be forced inwardly into the Fig. 5 position. Then, the plates 36 will be held in such position by the latch arms 46. Each such arm is pivoted intermediate its ends (Fig. 6) on a stud 47, fixed to a hanger 31, and its inner end is raised to latching position by a spring 48, which connects the arm to a plate 49, which is fixed to hanger 31 and has an outturned lower end 50 adapted to be engaged by the latch arm as a stop to limit its upward movement. The latches 46 will thus maintain the stop plates 35 in their inner or Fig. 4 position after the plates 36 have moved out of engagement with cams 45.

The tray carriers, which normally hang pendant from their supporting chains 17 with the trays 12 positioned horizontally therein, or substantially so, are tilted into tray-emptying position while moving in their ascending and in their upper horizontal path of travel. This is effected by rolls 51, which are mounted one at each end of the tray carrier on the right hand side thereof, as viewed in Fig. 1. While the tray carrier is moving upwardly, these rolls 51 ride on trackways 52, fixed one to each side frame 6. Each trackway is in the form of a ninety degree arc with a cam 53 connected to the lower end of the arc-shaped part. As each tray carrier rises, its rolls 51 will first engage cams 53, whereby the carrier will be swung to the left, as shown in Fig. 1. This will occur at just about the same time as the inward camming of the stop plates 35. As each tray carrier continues its travel, its axis of pivotal suspension moves around the upper left hand sprocket 18 and its rolls 51 will ride onto the arc-shaped trackway 52. The latter will cause the carrier to be tilted more and more until the tray 12 therein is tilted to an angle of about 45 degrees, as shown by full lines in Fig. 2. When the tray is thus tilted, its contents will fall out and drop into an underlying receiver, preferably in the form of a chute 54 (Figs. 1 and 3), which is fixed at one end (Fig. 3) to the inner face of one side frame 6 and extends across through the space surrounded by chains 17 (Fig. 1) and through the other side frame 6 (Fig. 3). The chute 54 has a downward incline and its outer end may deliver the confections and starch into the brush-lined sieve of my prior patent.

The chute 54 has side walls 55 (Fig. 1) and an inner wall 56 (Figs. 1 and 3) but its other and lower end is open for delivery of the confections and starch as described. Preferably, a thin metal plate 58 (Fig. 1) is secured to the trackways 52 and spans the space between them (Fig. 3) extending from their lower ends (Fig. 1) about halfway up along the curved parts thereof. Some starch may fall from the tray as it starts to tilt and the plate 57 will prevent such starch from falling outside the chute 54. As the tray 12 is carried up along the trackways 52 its lower side edge will drag along plate 57, scraping the starch along the plate and eventually over its upper edge and into chute 54. A deflector plate 58 extends upwardly from the right hand wall 55 of the chute and then outwardly at an angle to a position close to shaft 22. This plate extends across between the side frames 6 and is suitably secured thereto. Plate 58 prevents starch from falling outside the chute and its upper inclined portion serves to direct any starch that may fall upon it back into the chute.

One hanger 31 of each tray carrier has fixed to and projecting beyond its upper end a fork 59 (Figs. 6 and 7). One arm of the fork is longer than the other and such arm is operable, as its tray carrier nears the end of its upper horizontal path of travel to engage the shaft 22, as shown in Fig. 2. After this occurs, continued movement of the chains 17 causes the tray carrier to turn clockwise, become completely inverted, and then swing back toward normal pendant position. When the axis of tube 30 lies vertically above the axis of shaft 22, the arc-shaped surface between the two arms of the fork will engage the shaft 22. At this time, the tray will have moved about 30 degrees clockwise from its upside-down position. The described engagement with shaft 22 will continue for 90 degrees and this will swing the tray carrier 90 degrees further. The tray carrier will be swung the remaining sixty degrees back into normal pendant position during a very short further travel of the chains 17 and, during this travel, the short arm of the fork will engage the shaft 22 and prevent uncontrolled swinging of the tray carrier by gravity action.

The carrier will be in its pendant position, when its lower edge reaches the level of the flanges 60 one on the upper edge of each of a pair of vertical plates 61, secured one to each of the side frames 6. Other vertical plates 62 are arranged in spaced parallel relation, one with each plate 61, and are also secured one to each side frame 6. At the upper end of each plate 62 is an outwardly diverging part 63, which clears the rolls 51 as the carrier swings in the latter stage of its movement into pendant position. The pairs of plates 61 and 62 form between them grooves 64 for receiving, one in each the rolls 51 on each tray carrier while it descends, whereby the tray 12 will be guided and positioned properly with relation to the nearest driving lugs 14 on chains 1, when the tray is deposited on the runways 9.

Before the tray is thus deposited, it is necessary to withdraw the holding plates 35. This is accomplished by abutments 65, fixed one to each side frame 6 in position to engage the ends of latch arms 46, as the tray carrier descends and move such arms to release plates 36 which are thereupon moved by springs 43 to carry the stop plates 35 out of overlying relation with the tray.

Thus, as each carrier descends, the tray 12 therein eventually engages the runways 9 and its downward movement is arrested while the carrier continues to move downwardly below the chains 1 and runways and the seats are disengaged from the tray. Then the carriers travel across in a horizontal path below chains 1 in position to pick up another tray and empty it in the same manner as above described.

It is desirable to loosen the starch in the trays before they are tilted to empty them. This may be done by rapping the trays. As shown herein in Fig. 13, a tray-rapping means is located to operate on one end of a tray 12 while it lies stationary in a position between the feeding position B and the position in which it is picked up by the tray carriers of the tray-emptying means. A rapping rod 66 is mounted to reciprocate in one side frame 6 toward and away from an end wall of the tray and the inner end of this rod can pass through a hole 67' in the adjacent side guide 15 in order to engage such end wall. The outer end of rod 66 has a pin and slot connection with the outer end of one arm of a bellcrank 67, pivotally mounted on the side frame 6. The outer end of the other arm of the bellcrank is connected to one end of a link 68 (Figs. 1 and 13). The other end of this link is fixed to a slide 69, having a longitudinal slot 70 (Fig. 1), through which a shaft 71 passes. This shaft is rotatably mounted in a bearing 72 (Fig. 13) fixed to a side frame 6 and has fixed to its inner end a collar 73. Near its other end, a cam 74 is fixed and beyond the cam a driving sprocket 75. On slide 69 is mounted a roll 76 (Fig. 1) to ride on cam 74. A spring 77 acts on slide 69 to hold the roll against the cam. The cam has two rises 78 and two sharp radial drops 79. As the roll 76 rides up on a rise 78, the rapper 66 is retracted and spring 77 is tensioned. When the roll rides off a rise 78, it is moved radially with a snap action by spring 77 and this drives the rapper 66 sharply against the end wall of a tray 12. The two lobes on cam 74 provide for two raps on each tray while it is stationary in the position shown. By this means the starch s in tray 12 is loosened as are the confections c molded therein.

The driving means for both sets of conveyer chains and for the rapping means are shown in more or less conventional form in Fig. 8. A drive shaft 80 carries a crank 81, connected by a link 82 to a lever 83, fulcrumed at its lower end on one end of a link 84, pivoted at its other end at 85 to the adjacent side frame 6. The upper end of lever 83 is pivotally connected to a horizontally-slidable rack 86, suitably supported from the adjacent side frame 6 and meshing with two spaced pinions 87 and 88. The pinion 88 is mounted near one end of the drive shaft 4 of conveyer chains 1. This pinion is loose on shaft 4 and has ratchet teeth 89 (Fig. 9) on one end face thereof which teeth are engaged by similar teeth 90 on a member 91. The latter is slidably keyed to shaft 4 and is urged by a spring 92 toward the pinion 88 to maintain the ratchet teeth 90 engaged with teeth 89. A collar 93, fixed to shaft 4, holds pinion 88 in proper axial position on the shaft. As shaft 81 revolves, the lever 83 will be rocked clockwise to shift rack 86 to the right. This will revolve pinion 88 counterclockwise and its teeth 89 will cam teeth 91 and member 90 to the right without driving shaft 4. A spring-urged pawl 94 (Fig. 10), pivoted to a side frame 6, engages one or the other of two teeth 95 in a disk 96, fixed to shaft 4 and prevents counterclockwise movement of the shaft. When the lever 83 is rocked counterclockwise, rack 86 will slide to the left and revolve pinion 88 clockwise, driving shaft 4 through the engaged ratchet teeth 89 and 90 in a clockwise direction through one-half revolution, thereby moving chains 1 a distance equal to the linear distance between two successive lugs 14 on a chain 1.

The pinion 87 (Fig. 11) is loosely mounted on a stub shaft 97, rotatably mounted in a bearing 98, fixed to a side frame 6. Slidably keyed to this shaft is a member 99, having ratchet teeth 100, pressed by a spring 101 into engagement with ratchet teeth 102 on one end face of pinion 87. Fixed to the outer end of shaft 97 is a sprocket 103, the hub of which engages the other end face of pinion 87. Also fixed to shaft 97 is a disk 104, having two ratchet teeth 105 (Fig. 12), spaced 180 degrees apart and adapted to be engaged by a spring-urged pawl 106 pivoted to frame 6. The pawl 106 prevents clockwise movement of shaft 97 but permits counterclockwise movement thereof. Hence, when rack 86 slides to the right, the pinion 87 will rotate counterclockwise and drive shaft 97 whereas, when the rack moves to the left, the pinion 87 will turn clockwise without turning shaft 97. The latter is thus driven, while shaft 4 and conveyer chains 1 are stationary. Sprocket 103 is connected by a chain 107 to an idler sprocket 108 fixed to a stub shaft 109, suitably and rotatably supported from the adjacent frame 6 and having fixed thereto a sprocket 110, which is connected by a chain 111 to the described sprocket 75 for operating the rapper cam 74.

The tray carrier chains 17 are driven continuously from shaft 9. A sprocket 112, fixed on shaft 9, is connected by a chain 113 to a sprocket 114, fixed to one end of a shaft 115, rotatably mounted in and extending between the side frames 6. On the other end of shaft 115 is fixed a sprocket 116 which is connected by a chain 117 to the described sprocket 23 (Fig. 3) on the drive shaft 22 for the chains 17.

In Fig. 14, I have indicated a means for driving the conveyer chains 1 continuously and in properly timed relation with chains 17 to enable the trays 12 to be successively lifted from their runways 9, emptied and replaced on their runways. In this case, a main drive shaft 118, mounted in side frames 6, has fixed thereto a sprocket 119 which drives by a chain 120 a sprocket 121, which is fixed to the drive shaft 4 for chains 1 and has twice the pitch diameter of sprocket 119. One-half a revolution of shaft 4 will as before, move chains 1 a linear distance equal to the distance between two successive lugs 14 on a chain 1. Such movement will be accomplished in one revolution of the drive shaft. The chains 17 are driven from shaft 118 in the same manner as before described, so as to move a distance equal to that between two successive rods 24 during one revolution of shaft 118. The rapper cam 74 may be driven by a chain 122 from shaft 5 at half the speed of the latter. Hence, two raps will be effected during each half revolution of shaft 5 and during such half revolution, chains 1 move a distance equal to that between successive lugs 14. The arrangement is such as to impart two raps to each tray, one near its leading end and one near its trailing end. In connection with the operation of lifting trays 12 from the runways while they are moving continuously, it is to be noted that the tray carriers can swing counterclockwise if necessary, while the trays are being lifted and while they are still engaged by driving lugs 14. The same can be true when the trays are replaced on the runways provided the lower part of the forward guideway 62 is cut off to permit. The freedom of the tray carriers to swing enables a tray 12 to be moved by two different conveyers for the short interval necessary to lift a tray off its runways or to deposit the tray on its runways.

The operation of the invention will now be described. Trays, such as 12 (Fig. 1) containing starch s and confections c, which have been molded therein and which have set, are fed into the confectionery molding machine at B. This is usually accomplished automatically, as by the tray feeding mechanism shown in my prior patent. The trays 12 are deposited one by one on runways 9 in longitudinally-spaced relation and are moved along these runways in any suitable way. As the trays move along the runways, they are preferably rapped by the rapper 66 in order to loosen the contents, the better to empty the tray when it later becomes inverted. The trays are usually moved by conveyer chains, such as 1, which may be driven in step by step fashion or continuously, as desired. The only function of the conveyer 1, necessary to this invention, is to move the trays into proper longitudinal position on the runways 9 at the proper time to be picked up by the tray carriers of the emptying mechanism and to remove the empty trays as fast as they are deposited on these runways. The side guides 15 serve to position the trays laterally on the runways so that both ends of each tray project beyond the outer sides of the runways and in proper position to fit between the sides 31 of a tray carrier and in the tray-receiving seats, provided therein by the flanges 32 and 33 and the lower portion of sides 31.

The endless conveyer elements 17, from which the series of tray carriers are suspended, move continuously in an open loop path comprising, a lower stretch along, above and close to the runways, an upper stretch, and ascending and descending stretches. The tray carriers, while moving in their lower stretch of travel, straddle the runways 9 and conveyer chains 1 (Fig. 3) and the tray receiving seats of the carriers move along at a level below these runways. Thus, each carrier is enabled to rise and carry its seats over the projecting ends of a tray 12 and lift the same off the runways 9 and out of the path of the driving lugs 14 on chains 1. This action occurs in the initial part of the ascending stretch of travel of each carrier. As each carrier continues its rising movement, the rolls 51 thereon engage the lower end of trackways 53, which force the tray-carrier to the left, starting the tilting movement of the tray-carrier about its axis of suspension. Before the tilting movement has progressed far, the stationary cams 45 engage the plates 36 and force the stops 35 into overlying relation with the upper edges of the end walls of the tray and the latches 46 move in to hold the plates so positioned, after they later become disengaged from their cams. The tray is now retained in its carrier so as not to fall out when the carrier is inverted. As each carrier continues its ascending movement, the rolls 51 ride onto curved trackways 52, which force the carrier to tilt more and more. Eventually, each carrier will be swung so that the tray 12 therein will be tilted to an angle of about 45 degrees with chains 17. This occurs when the rolls of the trailing end of a carrier near the upper ends of the trackways 52, as shown in Fig. 2. The contents of the tray will then spill into the underlying chute 54. Any starch, which may spill out during the tilting movement before the tray reaches the emptying position described, will fall on the plate 57 and be scraped upwardly therealong by the lower side edge of the tray and carried over the upper edge of this plate into the chute 54. This chute slopes downwardly and outwardly from its closed end 56 but its slope is not great enough so that the material dropped therein slides precipitously out of it into the upper end of the reciprocating brush-lined sieve of my prior patent, as above described. The slope is such that a layer of starch of substantial depth, say an inch or two, is maintained in the chute for the purpose of cushioning the fall of the molded confections c emptied from the trays.

After the tray in a carrier has been emptied, as described, the carrier is moved back to its normal pendant position prior to being deposited on the runways 9. While this may be done in other ways, I prefer the means shown as giving control of the tray movement at all times, as distinguished from releasing the tray and allowing gravity to move it back all at once, which would produce undesired swinging of the tray. The long arm of fork 59 engages shaft 22 before rolls 51 leave tracks 52. Then, the chains 17, pulling the carrier along at its axis of suspension, will force the trays to swing rapidly upward about the shaft 22 as a fulcrum. The tray will be completely inverted and any starch falling from it, will fall on deflector 58 and be conveyed into chute 54. As the pivotal connection of each carrier moves around the ninety degree arc at the junction of the upper and the descending stretches of travel of chains 17, the rounded part of fork 59, between its arms, rests on shaft 22 and helps take some of the load of the tray off the sprockets. As such pivotal connection of a carrier moves vertically downward from the end of the described arc, the short arm of the fork engages shaft 22 and holds the carrier from a sudden downward swinging movement, causing the carrier to swing gradually into its normal pendant position.

The rolls 51 of a carrier as it swings into its normal pendant position will swing against the right hand wall of guide 61, the end 63 being bent outwardly to clear the rolls as the carrier makes the portion of its swinging movement. The rolls 51 can then be guided into slots 64. As the rolls enter these slots, the latches 46 engage abutments 65, causing the release of plates 36 and the retraction of stops 35 so that the tray seats may move off the tray after it has been deposited on the runways. The carriers then move in their lower stretch of travel to pick up another tray, while the emptied tray is moved along the runways 9 by the chains 1 to the various other mechanisms not shown herein but described in my prior patent, above-identified.

Thus, I have provided an improved tray-emptying device for use in confectionery molding machines and characterized by continuous and fast movement of the tray carriers and smoother and more quiet operation than the intermittently operable tray dumpers heretofore used.

I claim:

1. Tray emptying mechanism, comprising, two laterally - spaced endless conveyer elements mounted to travel in a closed loop path having upper and lower and ascending and descending stretches of travel, a drive shaft, driving wheels fixed thereto one for each element and located at the junction of the upper and descending stretches of travel, a series of tray carriers carried by said elements; each carrier at one end being pivotally supported from both elements, located therebetween and tending to hang pendant therefrom; each carrier at the other end having a tray-receiving seat; means operable to tilt the carriers and move them into tray emptying position as their leading ends successively near the end of said upper stretch of travel, and an arm fixed to each carrier and projecting beyond the pivoted end thereof in a direction opposite from the seat-carrying end; the arm of each carrier being engageable with said shaft, as the leading end of the carrier nears said driving wheels, whereby continued movement of the elements, pulling on the pivotal connection of the carriers, will swing the latter about said shaft as a fulcrum into completely inverted position and then allow it to move back into normal pendant position.

2. Tray emptying mechanism, comprising, two laterally-spaced endless conveyer elements mounted to travel in a closed loop path having upper and lower and ascending and descending stretches of travel, a drive shaft, driving wheels fixed thereto one for each element and located at the junction of the upper and descending stretches of travel, a series of tray carriers carried by said elements; each carrier at one end being pivotally supported from both elements, located therebetween and tending to hang pendant therefrom; each carrier at the other end having a tray-receiving seat; means operable to tilt the carriers and move them into tray-emptying position as their leading ends successively near the end of said upper stretch of travel, and a fork fixed to each carrier and projecting beyond the pivoted end thereof in a direction opposite from the seat-carrying end; one arm of each fork being engageable with said shaft as the leading end of its carrier nears said driving wheels, whereby continued movement of said elements pulling on the pivotal connections of the carrier will swing the latter about the shaft as a fulcrum and invert the carrier, the other arm of each fork engaging said shaft to prevent uncontrolled swinging of the carrier into normal pendant by the action of gravity as the leading end of the carrier moves around the driving wheels from its upper to its descending stretch of travel.

3. Tray emptying mechanism, comprising, two laterally-spaced endless conveyer elements mounted to travel in a closed loop path having upper and lower and ascending and descending stretches of travel, a drive shaft, driving wheels fixed thereto one for each element and located at the junction of the upper and descending stretches of travel, a series of tray carriers carried by said elements; each carrier at one end being pivotally supported from both elements, located therebetween and tending to hang pendant therefrom; each carrier at the other end having a tray-receiving seat; means operable to tilt the carriers and move them into tray-emptying position as their leading ends successively near the end of said upper stretch of travel, and a fork fixed to each carrier and projecting beyond the pivoted end thereof in a direction opposite from the seat-carrying end; one arm of each fork being engageable with said shaft as the leading end of its carrier nears said driving wheels, whereby continued movement of said elements pulling on the pivotal connections of the carrier will swing the latter about the shaft as a fulcrum and invert the carrier, the other arm of each fork engaging said shaft to prevent uncontrolled swinging of the carrier into normal pendant position by the action of gravity as the leading end of the carrier moves around the driving wheels from its upper to its descending stretch of travel, fixed guideways engageable with the rolls of each carrier to guide it as it moves in its descending stretch of travel, and means for successively removing from the carrier the trays that are guided to it by said guideways.

4. Tray-emptying mechanism, comprising, two laterally-spaced endless conveyer elements mounted to travel in a closed loop path including a lower stretch, an ascending stretch, an upper stretch and a descending stretch; a series of cross rods connected to said elements at spaced intervals and extending between them, tray carriers one for each rod, each carrier having a tubular cross member loosely mounted on its rod and two sides fixed to said cross member one near each end thereof and depending therefrom; said sides having confronting tray-receiving seats adapted to engage the bottom, sides and ends of a tray to confine it against endwise or sidewise movement; a stop mounted on each said side for movement into and out of a position to overlie the top of a tray, means for successively feeding trays to said carriers as they move in their ascending stretch of travel, means mounted adjacent said last-named stretch of travel and successively operable on the carrier to move said stops thereof into said overlying position, stationary guiding means adjacent the path of travel of the carriers and successively operable on them during their upper stretch of travel to tilt the carriers into tray-emptying position and subsequently enable them to move back into pendant position during their descending stretch of travel, and stationary means adjacent the last-named stretch of travel and successively operable to cause said stops of the carriers to move out of said overlying position, and means for successively removing trays from the carriers near the end of said descending stretch of travel.

5. Tray-emptying mechanism, comprising, two laterally-spaced endless conveyer elements mounted to travel in a closed loop path including a lower stretch, an ascending stretch, an upper stretch and a descending stretch; a series of cross rods connected to said elements at spaced intervals and extending between them, tray carriers one for each rod, each carrier having a cross member pivotally mounted on its rod and two sides fixed to said cross member one near each end thereof and depending therefrom; said sides having tray-receiving seats one in each and each adapted to engage portions of the bottom, side walls and end walls near the ends of a tray to confine the tray against endwise or sidewise movement; a stop mounted on each said side for movement into and out of a position to overlie the top of the tray, spring means holding said stops out of overlying position, tray-moving means for successively positioning trays to be lifted by said carriers in the initial portion of their ascending stretch of travel, cam means adjacent the last-named stretch of travel and successively operable on the carriers to move the stops thereof into overlying position, latches one on each said side for holding the stops in said overlying position, means successively engageable with the carriers for tilting them in their upper stretch of travel into tray-emptying position and for restoring them to pendant position in the initial part of their descending stretch of travel, and an abutment adjacent the last-named stretch of travel and successively operable on each carrier to release the latches thereon and enable the spring means to move said stops out of overlying position, whereby trays in the carriers may be successively deposited on tray-moving means as the seats on the carrier move downwardly below the same.

6. Tray-emptying mechanism, comprising, two laterally-spaced endless conveyer elements mounted to travel in a closed loop path including upper and lower and ascending and descending stretches of travel, a series of tray carriers carried by said elements; each carrier comprising two laterally-spaced sides, one adjacent each element and pivotally connected thereto at one end and normally hanging pendant therefrom, said sides at their other ends having confronting tray-receiving seats one on each, and a cross member rigidly interconnecting said sides near the first-named end; a conveyer for feeding trays to and removing them from said carriers; means for rapping the trays before they are fed to said carriers; said second-named conveyer movable between the sides of each carrier while the latter is moving in said lower stretch of travel, below its cross member, below said endless conveyer elements, and above the tray-receiving seats of such carrier, whereby each carrier may rise from beneath a tray on the second conveyer and lift a tray therefrom and whereby subsequently each carrier may descend toward the second conveyer and deposit a tray thereon and then move down to disengage its seat from the tray, and means successively cooperating with the carriers to tilt them first into tray-emptying position while moving in said upper stretch of travel and subsequently into normal pendant position while moving in the initial part of said descending stretch of travel, and a receiver underlying said conveyer elements in their upper stretch of travel and into which the trays empty when tilted.

7. A machine for emptying open-topped trays filled with confections molded in starch, comprising, a pair of laterally-spaced endless conveyers mounted to travel in a closed loop path, a series of tray carriers each pivotally connected to and extending between said pair of conveyers, said conveyers moving in a lower path, then in an ascending path, then in an upper path and then in a descending path, means for successively moving trays into position to be successively lifted by said carriers as they move in said ascending path, means for successively moving the carriers about their pivotal connections with said conveyers to empty the trays therein while traveling in said upper path, a chute with an imperforate bottom extending transversely through the two loops formed one by each of said conveyers and underlying the carriers as they are successively moved into tray-emptying position, said chute having a slope such that a layer of starch will be maintained in said chute to cushion the fall of the confections falling from the trays, means for moving the carriers back into normal pendant position as they move in said descending path, and means for successively removing empty trays from the carriers as they successively approach the lower end of said descending path.

ALONZO LINTON BAUSMAN.

REFERENCES CITED

The following references are of record in the file of this patent:

UNITED STATES PATENTS

| Number | Name | Date |
| --- | --- | --- |
| 648,353 | Carlson | Apr. 24, 1900 |
| 1,112,816 | Manchester | Oct. 6, 1914 |
| 2,407,782 | Hardy | Sept. 17, 1946 |